United States Patent [19]

Clark, Jr. et al.

[11] Patent Number: 4,731,818
[45] Date of Patent: Mar. 15, 1988

[54] SELF-COMPUTING CREDIT CARD TELEPHONE PAYSTATION METHOD AND SYSTEM

[75] Inventors: Robert A. Clark, Jr., Lauderdale; Jay D. Brussels, Lauderhill, both of Fla.

[73] Assignee: Communication Equipment & Engineering Co., Plantation, Fla.

[21] Appl. No.: 804,880

[22] Filed: Dec. 5, 1985

[51] Int. Cl.[4] .................................. H04M 17/02
[52] U.S. Cl. .................................. 379/144; 379/91; 235/380
[58] Field of Search ............... 179/2 CA, 6.3 CC; 235/380, 381, 379; 379/91, 144

[56] References Cited

U.S. PATENT DOCUMENTS

| | | | |
|---|---|---|---|
| 4,017,835 | 4/1977 | Randolph | 379/91 |
| 4,320,256 | 3/1982 | Freeman | 179/6.04 |
| 4,439,636 | 3/1984 | Newkirk et al. | 179/7.1 R |
| 4,517,412 | 5/1985 | Newkirk et al. | 179/7.1 R |
| 4,538,056 | 8/1985 | Young et al. | 235/377 |

OTHER PUBLICATIONS

Weinstein, S. B., "Smart Credit Cards the Answer to Cashless Shopping", I.E.E.E. Spectrum, 2/84, pp. 43–49.

Gordon, T. H. et al., "Polled Access Interface", Bell System Tech. Jour. vol. 57, No. 10, 12/78, pp. 3427-3439.

"Telepayment and Electronic Money; The Smart Card", A. Turbat, Commutation & Transmission, No. 5, Dec. 1982, pp. 11-20.

Primary Examiner—Robert Lev
Attorney, Agent, or Firm—Mason, Kolehmainen, Rathburn & Wyss

[57] ABSTRACT

A method and apparatus for processing a call from a credit card telephone paystation reads magnetic encoded data on a credit card and produces a credit card identification signal. The credit card identification signal is identified as valid prior to enabling the telephone call. Call information data is stored at the telephone paystation including the credit card identification signal, the called number, the time and date of the call and the call duration. The stored call data is transmitted at periodic intervals to a central billing computer upon request by the central billing computer.

3 Claims, 3 Drawing Figures

SELF-COMPUTING CREDIT CARD TELEPHONE PAYSTATION METHOD AND SYSTEM

BACKGROUND OF THE INVENTION

A. Field of the Invention

The present invention relates generally to telephones; and more particularly, to a new and improved control method and system for a credit card telephone paystation.

B. Description of the Prior Art

Conventional credit card telephone paystations include a magnetic card reader for reading data encoded on a magnetic strip carried on a credit card, checking the validity of the data, and storing the data for use in establishing a telephone call. A telephone call is established from such conventional credit card telephone paystations by the paystation sequentially transmitting a calling number identification signal and the credit card data signal before transmitting a called number identification signal to the telephone company central office. Special central office equipment is required for collecting billing information for each call made with the credit card data signal. Additionally, the conventional credit card telephone paystations are limited to a small number of different types of credit cards of several major types that are commonly carried by telephone users.

It is highly desirable to provide a credit card telephone paystation capable of accepting many different types of major credit cards and that does not require special equipment at the telephone company central office for billing purposes.

SUMMARY OF THE INVENTION

It is an object of the present invention to provide a method and apparatus for credit card telephone paystations that overcome many of the disadvantages of existing systems.

It is another object of the present invention to provide a new and improved method and control system for processing a telephone call from a telephone paystation.

It is a further object of the present invention to provide a new and improved method and control system for processing a telephone call from a credit card telephone paystation that will accept a plurality of different types of credit cards.

It is still another object of the present invention to provide a new and improved method and control system for processing a telephone call from a credit card telephone paystation that identifies a valid credit card identification signal prior to enabling the call.

It is a still further object of the present invention to provide a new and improved method and control system for processing a telephone call from a credit card telephone paystation including detecting and storing call data with a credit card identification data and periodically transmitting the stored data to a central computer.

Briefly, in accordance with a preferred embodiment of the invention, there is provided a method and control system for use with a telephone paystation for detecting and storing call data with credit card identification data for later retrieval by a central computer. Magnetic encoded data on a credit card is read to produce a credit card identification signal that is determined to be valid prior to enabling a telephone call. Once the telephone call has been established, the credit card identification signal is stored with call data including the terminating or dialed telephone number, time and date of a detected call connection signal and the call duration. Periodically the stored data is transmitted to the central computer after a data request is received from the central computer.

DESCRIPTION OF THE DRAWING

These and other objects and advantages of the present invention will become readily apparent upojn consideration of the following detailed description and attached drawing, wherein.

DETAILED DESCRIPTION OF THE PREFERRED EMBODIMENT

Figure 1:
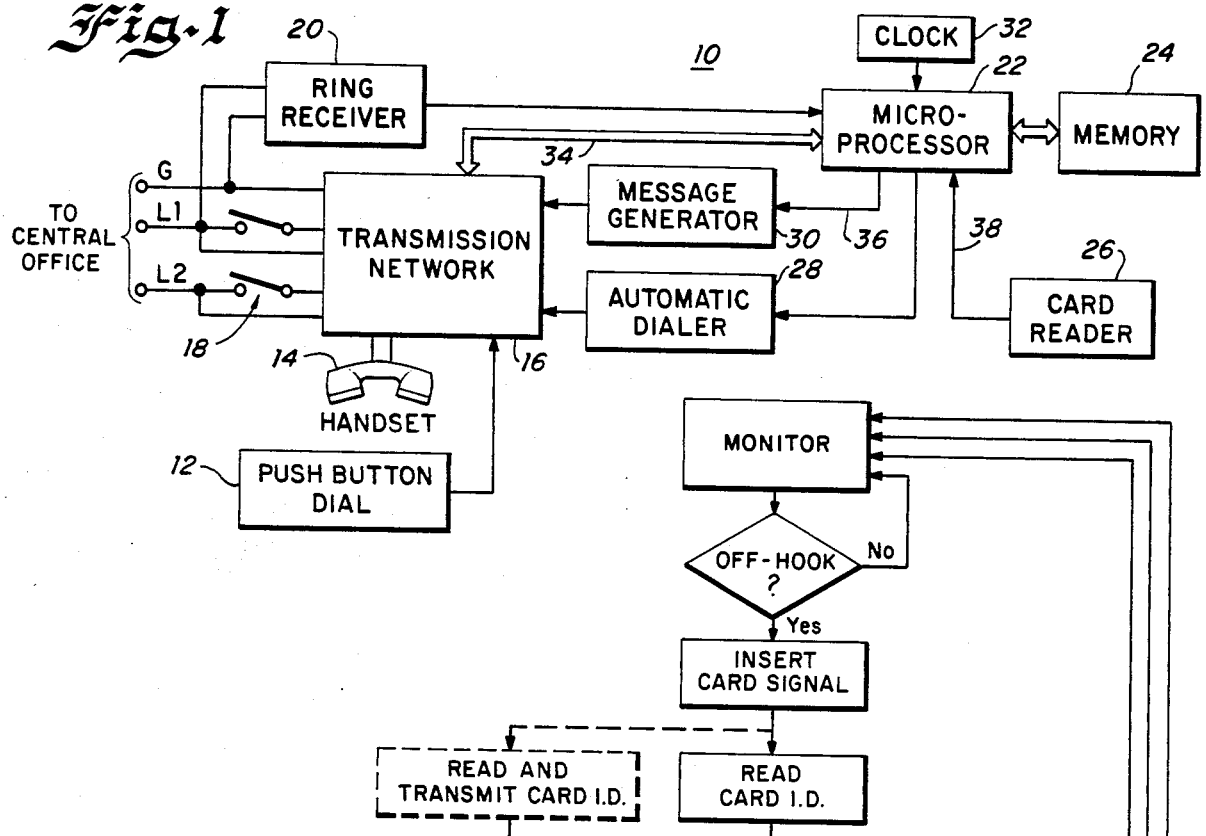
FIG. 1 is a block diagram of a self computing credit card telephone paystation apparatus in accordance with the principles of the present invention.

Referring to the drawing and initially to FIG. 1, there is illustrated a block diagram of a self-computing credit card telephone paystation according to the present invention and designated by the reference numeral 10. The telephone paystation 10 is capable of detecting and storing call information with credit card identification data during a given period, one day for example, and transmitting that information to a remote central computer upon receiving a data request from the central computer. The data requests may be made periodically at selected off-peak times increasing the efficiency of billing calls made from the paystation 10, as compared to real time monitoring of each call by a central computer.

Conventional telephone components are used in the telephone paystation including a pushbutton dial 12 for generating multifrequency tones or dial pulses, a handset 14 having a transmitter and a receiver, a transmission network 16 that is connected via a hook switch 18 to telephone company lines L1 (ring) and L2 (tip), and a ring receiver 20 that is connected to the telephone company line L1 for receiving a ringing signal from the telephone company central office.

A microprocessor control system 22 and an associated memory 24 function to control the telephone paystation 10 and store the call information. The microprocessor control system 22 includes a microprocessor that may be an 8-bit microprocessor such as a Motorola 6803 microprocessor, however, various other commercially available microprocessor having standard capabilities can be used. The microprocessor control system is programmable to perform the functions described below and includes, in known manner, a clock or external crystal oscillator, line driver/buffer logic circuitry for coupling for data and control inputs and outputs from the microprocessor. The memory 24 may include an electrically eraseable programmable read only memory EEPROM that stores the system program and random access memory RAM that stores system parameer data and call information data.

The telephone paystation includes a magnetic card reader 26 for reading data encoded on a magnetic strip contained on a telephone user's credit card and generating a corresponding credit card identification signal that is applied to the microprocessor control system 22. An automatic dialer 28 may be used for establishing a connection via transmission network 16 and telephone lines L1 and L2 to a central credit card computer to obtain authorization for a particular credit card prior to enabling a telephone call. A message generator 30 produces a plurality of predefined messages audible to a telephone user via the handset 14 for instructing the user on use of the paystation 10. A real time clock 32, such as a real time clock and calendar device sold under the designation MSM6242 by Oki, provides the time of the occurrence a connection and date data for each telephone call to the microprocessor control system 22.

Figure 2:
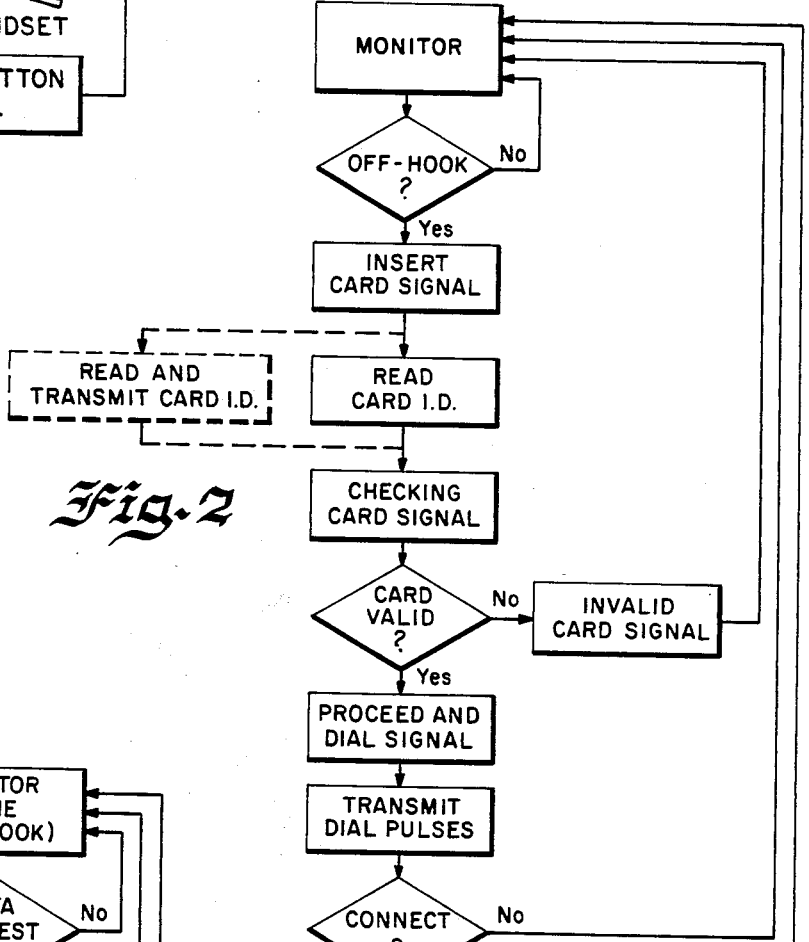
FIG. 2 is a flow chart illustrating the logical steps performed by the paystation apparatus of FIG. 1 during a telephone call made from the pay station.

Referring also to FIG. 2, there is shown a flow chart illustrating the logical steps performed by the microprocessor control system 22. In operation the user lifts the handset 14 and an off-hook signal is coupled to the microprocessor control system 22 via a bidirectional bus 34. The microprocessor 12 transmits a predefined signal at line 36 to the message generator 30. Message generator 30 then produces an audible signal instructing the caller to slide a credit card through a slide mechanism in card reader 26. As the caller slides a credit card through the slide mechanism, card reader 26 reads information from a magnetic stripe on the credit card and transmits the credit card identification signal microprocessor control system 22 at line 38. Upon receiving the credit card identification signal, the microprocessor control system 22 compares the received identification signal with a plurality of stored signals to determine if a valid type of credit card is being used.

In accordance with an alternative method of operation of the telephone paystation 10 (FIG. 2 in dotted line), the microprocessor control system 22 transmits an enable signal to the automatic dialer 28 which dials a central credit card authorization computer. After a connect signal is detected, the microprocessor system 22 transmits the central identification signal to the credit card authorization computer. The central credit card computer transmits an authorization signal to the telephone paystation 10 for a valid credit card identification signal.

While the information read from the caller's credit card is being compared by the microprocessor control system 22 or the central credit card computer, microprocessor control system 22 applies a predetermined signal at line 36 to message generator 30 which produces a responsive message informing the user that the credit card is being checked.

A determination is made that the credit card is invalid if no match is found in the compared stored signals with the received identification signal. In accordance with the alternative method, an invalid credit card determination is made when the microprocessor control system does not detect an authorization signal transmitted by the credit card computer in response to the particular credit card identification signal. In response to an invalid credit card determination, the microprocessor control system 22 provides a predetermined signal to the message generator 30 that produces a responsive message notifying the user that the credit card is not accepted.

A determination is made by the microprocessor control system 22 that the credit card is valid if a match is found in the compared stored signals with the credit card identification signal. Alternatively, a valid signal determination is made when the microprocessor control system 22 detects an authorization signal transmitted via the telephone lines L1 and L2 transmission network 16 from the central credit card computer. Microprocessor 22 applies an enable signal via bus 34 to the transmission network 16 and a predetermined signal to the message generator 30 that produces a responsive message instructing the caller to dial the desired number. The caller then dials the desired number using the pushbutton dial 12 that generates the multifrequency tones or dial pulses that are transmitted to the telephone company central office via then enabled transmission network 16 and to the microprocessor control system 22 via bus 34.

When the called party answers, a connect signal is detected by microprocessor control system 22 via the ring receiver 20 that receives the telephone company central office ring back signal that terminates upon a connection for a telephone call. Then call information is stored including the credit card identification signal, the called number, the time of the occurrence of the connect signal and the date of the call. The authorization signal received from the central credit card authorization computer also is stored when the alternative method of the invention is performed. At the conclusion of the call, a disconnect signal is detected and the duration of the call is stored. The microprocessor 22 control system returns to monitoring for a next use of the telephone paystation 10.

Call information for calls made during a selected period of time is stored with the credit card identification in the memory 24 until retrieved periodically by the central billing computer. Preferably during an off-peak time, the central billing computer transmits a data request signal to the paystation 10. Microprocessor 22 compares the incoming signal with a stored data request signal to identify the billing computer prior transmitting the stored information or data. After the call data has been transmitted to the billing computer, the call data is cleared in memory 24 and the paystation 10 is ready for future calls.

Figure 3:
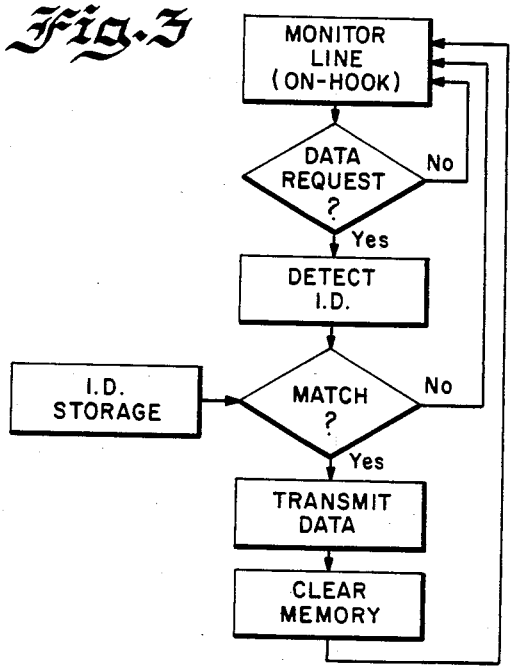
FIG. 3 is a flow chart illustrating the logical steps performed by paystation apparatus of FIG. 1 in response to a data request transmitted by a host computer.

Referring to FIG. 3, there is illustrated a flow chart of the logical steps performed by the microprocessor control system in response to a data request by the central billing computer. When an incoming signal is received, the microprocessor control system 22 determines whether the incoming signal is a data request from the central computer. If the incoming signal is not a data request, microprocessor control system 22 returns to a quiescent state. If it is determined the signal is a data request microprocessor control system 22 and compares the incoming data request signal with a stored identificatiion signal. If the compared signals do not match, microprocessor 22 ignores the incoming signal and returns to quiescent. If the compared signals match, microprocessor 22 transmits the stored call data to the central computer. At the conclusion of the data transmission, the memory 24 is cleared and the telephone paystation 10 is ready to process subsequent telephone calls.

During the data transmission, the handset is disconnected via the controlled function of transmission network 16 and no outgoing calls may be placed. Data transmission is performed during a very short time interval and during an off-peak time for telephone usage, so that the disruption of service is minimized.

Although the present invention has been described in connection with details of the preferred embodiment, many alterations and modifications may be made without departing from the invention. Accordingly, it is intended that all such alterations and modifications be considered as within the spirit and scope of the invention as defined in the appended claims.

What is claimed and desired to be secured by Letters Patent is:

1. A method for processing a telephone call by a credit card telephone paystation, comprising the steps of:
   reading a magnetic credit card to produce an identification signal;
   comparing said identification signal with a plurality of predetermined stored signals within the credit card telephone paystation;
   detecting a match of said compared signals;
   identifying a valid identification signal responsive to said detected match;
   enabling the teleophone call after a valid identification signal is identified;
   detecting a number dialed;
   detecting a call connection signal and a time of occurrence thereof;
   detecting a call disconnection signal and a time of occurrence thereof;
   determining a duration of the telephone call;
   storing call data within the credit card telephone paystation, said call data including said detected number dialed, said time of occurrence of said detected call connection signal, said determined call duration and said identification signal;
   receiving an incoming predetermined signal from a central computer, said central computer generating and transmitting said predetermined signal at a selected time and being off-line until said selected time;
   comparing said received incoming signal with a stored data request signal;
   ignoring said incoming signal if said comparing signals do not match; and
   transmitting said stored call data if said compared signals match.

2. A method as recited in claim 1 further comprising the steps of providing messages audible to a user instructing said user to insert a credit card for reading, indicating said credit card is being evaluated for authorization, informing said user whether said credit card is valid, and instructing said user to dial the desired number.

3. A telephone paystation comprising:
   means for reading a magnetic credit card and to produce a credit identification signal,
   means for comparing said identification signal with a plurality of predetermined stored signals within the credit card telephone paystation;
   means for detecting a match of said compared signals;
   means for identifying a valid identification signal responsve to said detected match;
   means responsive to said identified valid identification signal for enabling the telephone call;
   means for detecting a number dialed;
   means for detecting a call connection signal and a time of occurrence thereof;
   means for detecting a call disconnection signal and a time of occurrence thereof;
   means for determining a duration of the telephone call;
   means for storing said credit card identification signal and call information data, said call information data including said detected number dialed, said time of occurrence of said detected call connection signal and said determined call duration;
   means for receiving an incoming predetermined data request signal from a central computer, said central computer generating and transmitting said predetermined signal at a selected time and being off-line until said selected time;
   means for comparing said received predetermined data request signal with a stored data request signal to identify a match; and
   means responsive to said identified match for transmitting said stored credit card identificatiion signal and call information data to said central computer.

* * * * *